US006152292A

United States Patent [19]
Matteucci et al.

[11] Patent Number: 6,152,292

[45] Date of Patent: Nov. 28, 2000

[54] DEVICE FOR AUTOMATIC ELIMINATION OF SCRAPS IN THE MANUFACTURE OF ROLLS OF PAPER

[75] Inventors: Renato Matteucci, San Gemignano di Moriano; Giuseppe Lupi, Gallicano; Mauro Biagioni, Castiglione di Garfagnana, all of Italy

[73] Assignee: Italconverting SRL, Ulucca, Italy

[21] Appl. No.: 09/113,340

[22] Filed: Jul. 10, 1998

[51] Int. Cl.[7] .............................. B65G 15/14; B26D 7/32

[52] U.S. Cl. .................................... 198/626.1; 198/626.5; 198/626.6; 83/104; 83/149; 83/167

[58] Field of Search ............................. 198/626.5, 626.6, 198/626.1; 83/149, 155, 104, 167

[56] References Cited

U.S. PATENT DOCUMENTS

| | | | |
|---|---|---|---|
| 1,109,259 | 9/1914 | Baker et al. | 198/626.5 |
| 1,268,388 | 6/1918 | Rukes | 198/626.6 |
| 3,376,969 | 4/1968 | Baker et al. | 198/626.6 |
| 3,581,876 | 6/1971 | Milroy | 198/626.6 |
| 3,905,260 | 9/1975 | Nystrand . | |
| 4,230,218 | 10/1980 | Kunzmann | 198/626.5 |
| 4,265,361 | 5/1981 | Schroeder . | |
| 4,462,287 | 7/1984 | Weis et al. . | |
| 4,694,953 | 9/1987 | Murphy et al. | 198/626.5 |
| 4,721,038 | 1/1988 | Eldridge . | |
| 4,771,668 | 9/1988 | Happ et al. . | |
| 4,773,522 | 9/1988 | Lenhart | 198/425 |
| 4,789,055 | 12/1988 | Steurmer | 198/626.5 |
| 5,458,033 | 10/1995 | Wierschke . | |

FOREIGN PATENT DOCUMENTS

| | | | |
|---|---|---|---|
| 0 607 761 | 7/1994 | European Pat. Off. . | |
| 1206268 | 2/1960 | France | 198/626.5 |
| 62-88710 | 4/1987 | Japan | 198/626.5 |
| 2 122 582 | 1/1984 | United Kingdom . | |
| 2 137 918 | 10/1984 | United Kingdom . | |

*Primary Examiner*—Douglas Hess
*Attorney, Agent, or Firm*—Sughrue, Mion, Zinn, Macpeak & Seas, PLLC

[57] ABSTRACT

A device for eliminating the head and tail scraps (S) that are left after rolls of paper (2), such as toilet paper, kitchen paper, paper for industrial use and the like, have been cut from a log, said device comprising two belts (4, 5) arranged in a vertical plane at an adjustable distance, to adapt the distance between their inside opposite branches (4', 5') to the size of the roll (R), so that the latter is gripped and conveyed between said belts (4, 5), whereas a scrap (S), smaller in size, rests only on the lower belt (4'), in the vicinity of its center line, falling through loss of balance of the resting point.

12 Claims, 3 Drawing Sheets

DEVICE FOR AUTOMATIC ELIMINATION OF SCRAPS IN THE MANUFACTURE OF ROLLS OF PAPER

FIELD OF THE INVENTION

The present invention relates to a device for automatic elimination of scraps or trimmings in the manufacture of rolls of paper, such as toilet paper, kitchen paper, paper for industrial or other use, and more particularly for elimination of the head and tail scraps that are left after rolls of a predetermined length have been cut from a long log.

BACKGROUND OF THE INVENTION

In the manufacture of rolls of paper, a web of paper of a certain width is wound onto a core, normally of cardboard, to form a log of the desired diameter. The log is then cut to contain a plurality of rolls of the desired length, depending upon the intended use of the paper. To obtain uniform rolls after cutting, head and tail scraps are obtained on each log, that is, portions of variable length are cut and eliminated at the respective ends of each log, where the edges of the various superimposed layers of paper are not aligned with each other.

These scraps are eliminated manually, deploying a person at the exit of the product from the cutting-off machine.

Automatic systems for eliminating the scraps have been proposed, but they have not proved completely efficient.

A widely used system consists in having the cut rolls of paper travel along the portion between the cutting station and the wrapping station on conveyor belts between which transverse slits of an appropriate width are obtained, into which the head and tail scraps should fall along the way.

In practice, however, it happens that not all the scraps fall from the slits, causing poor operation of the machine.

The object of the invention is precisely that of eliminating this drawback, ensuring elimination of the head and tail scraps in the manufacture of rolls of paper, irrespective of the size of said scraps.

Another object of the invention is to provide a device for elimination of scraps that is simple and economical to produce.

These objects are achieved by the device according to the invention, which has the characteristics of the appended independent claim 1.

SUMMARY OF THE INVENTION

Essentially, according to the invention, two belt means are disposed at the outlet from the cutting-off machine, having a limited width and travelling in the same direction, at an adjustable distance from one another, the roll of the correct size being gripped therebetween and conveyed to its destination. On the contrary, the head and tail scraps, which are obviously smaller in size than a normal roll, rest only on the lower belt and are destined to fall into a chamber beneath. To facilitate this fall, a system of suitably shaped and bent plates can be provided at the entrance to the lower belt.

BRIEF DESCRIPTION OF THE DRAWINGS

Further characteristics of the invention will be made clearer by the detailed description that follows, referring to a purely exemplary and therefore non-limiting embodiment thereof, illustrated in the appended drawings in which.

DESCRIPTION OF THE PREFERRED EMBODIMENTS

Figure 6:
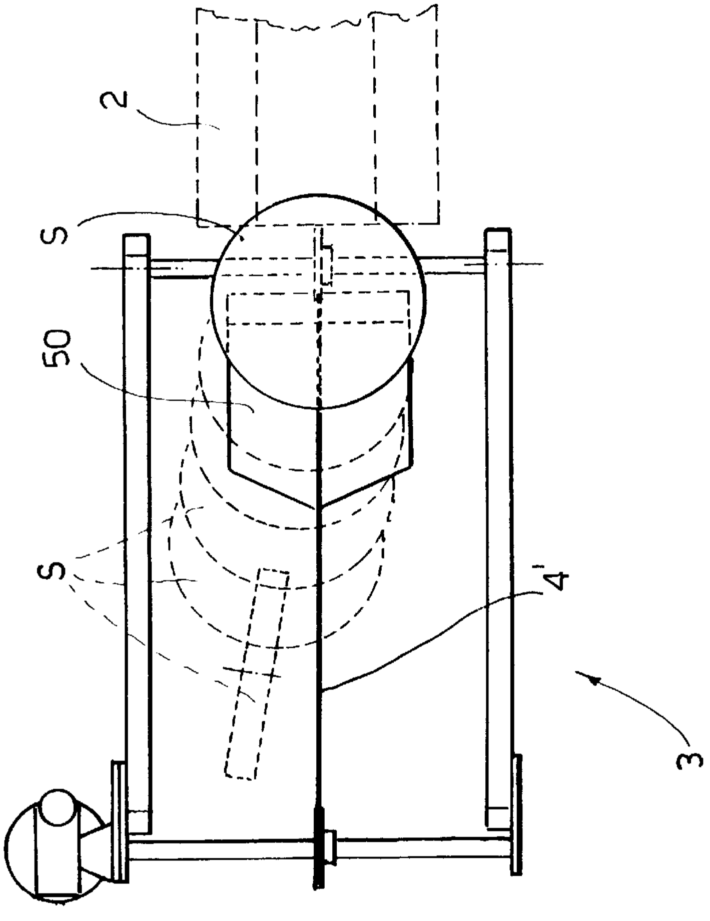
FIG. 6 is a plan view, taken in the direction of the arrows VI—VI of FIG. 5, diagrammatically showing operation of a system of plates that facilitates the fall of the scraps.

With reference to these figures, 1 indicates the device as a whole for automatic elimination of the scraps in the manufacture of rolls of paper according to the invention, to be disposed downstream of the cutting station of the machine, not shown in the drawings. Only in the plan view in FIG. 6 is a belt 2 shown schematically with a broken line, for transfer of the rolls and the scraps from the cutting station to the device 1 according to the invention, which must provide for elimination of the head and tail scraps of each log, before the rolls are directed toward the next station, for example the packing station, also not shown in the drawings.

The device 1 essentially comprises a metal structure 3, which supports a system of two belts 4, 5, arranged one on top of the other in the same vertical plane. The two belts 4 and 5 have a limited width, for example from 5 to 15 mm, and can have any cross-section, for example rectangular, round, square or trapezoid, just as they can have an outer sponge coating to achieve a better grip on the paper of the roll.

Figure 1:
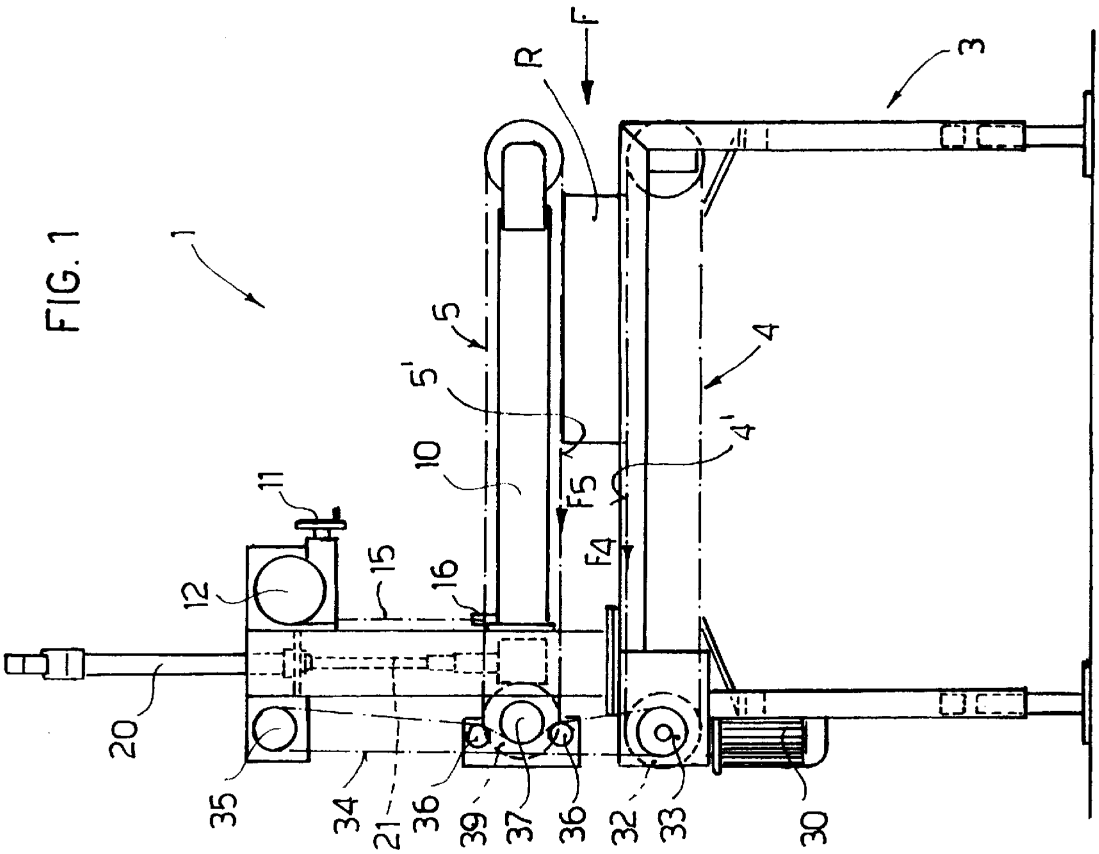
FIG. 1 is a side view of the device according to the invention, showing conveying of a roll of the correct size, disposed on a flat side.

The two belts, arranged in a closed loop, are driven so that the respective branches that work with the product, and that is the upper branch 4' of the bottom belt 4 and the lower branch 5' of the top belt 5 advance in the same direction, as indicated by the arrows F4, F5 in FIG. 1, which is the direction of travel of the product, indicated with the arrow F.

The bottom belt 4 is in a fixed position, whereas the top belt 5 can be adjusted in height to allow the device to be adapted to the various measurements of the product.

The mechanisms that allow the possibility of adjusting the height of the top belt 5 and movement of the belts 4 and 5 will now be described.

The top belt 5 is mounted on a carriage 10, guided vertically on the structure of the machine. The height of the carriage 10 is adjusted by means of a handwheel 11 which acts on a reduction unit 12 fixed to the structure 3 of the machine. On the shaft 14 of the reduction unit 12 are splined a pair of gears or crown wheels 13, which, by means of respective chains 15, one end 16 of which is fixed to the carriage 10, produce the vertical movement of the latter. In practice, raising of the carriage 10 takes place by winding of the chains 15 on the respective sprocket wheels 13, whilst lowering takes place by gravity, during unwinding of the chains.

Also constrained to the structure of the machine is a pneumatic cylinder 20, the rod 21 of which acts on the upper part of the carriage 10, acting as a damper for any small shifts from the nominal measurement set by means of the handwheel 11.

To drive the belts 4 and 5, a geared motor 30 is provided on one side of the structure 1, the output shaft 31 of which passes transversally through the structure 3 of the machine and has a pulley 32 at its center line to drive the bottom belt 4.

At the outer end of the shaft 31, on the opposite side with respect to the geared motor 30, a second pulley 33 is provided, which pulls a belt 34, which is returned on an upper idler pulley 35, supported by the structure 3 of the machine.

A pair of idler rollers 36 and a pulley 37 are provided on the carriage 10 supporting the top belt 5, disposed so that a branch of the belt 34 is interposed between the two idler rollers 36 and the pulley 37, drawing the latter into rotation, in the opposite direction of rotation to that of the lower pulley 32.

The pulley 37 is splined onto a shaft 38, disposed transversally to the machine, on the center line of which is disposed a pulley 39, which drives the top belt 5.

In particular, with reference to the front view in FIG. 1, the pulley 32 that drives the bottom belt 4 will turn anticlockwise, pulling in the same direction of rotation the belt 34, which will drive the pulley 37, and thus the pulley 39 in a clockwise direction. In this way, the opposite branches 4', 5' of the two belts 4, 5 will advance in same direction indicated by the arrows F4, F5.

Of course the distance between the belts 4 and 5, and thus the height of the belt 5, or of the carriage 10 that supports it, is adjusted according to the size of the roll to be transferred.

Figure 2:
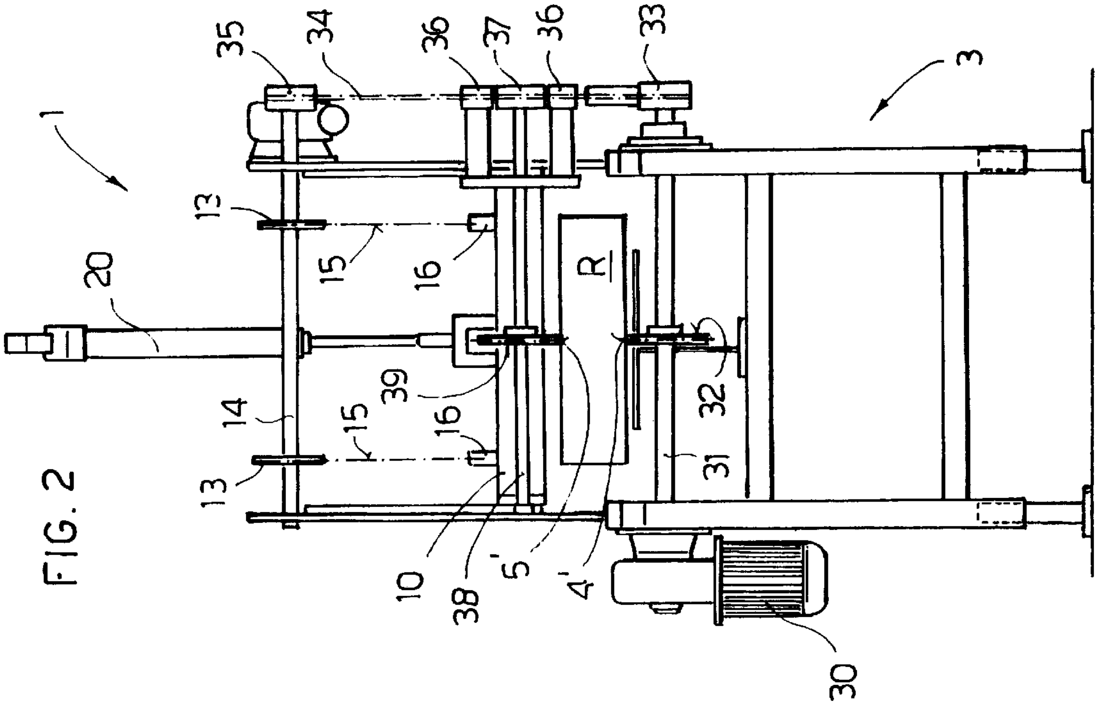
FIG. 2 is a front view, taken from the left side of FIG. 1 in FIG. 1.

FIGS. 1 and 2 show a roll R disposed flat, which taken at the middle between the two belts 4 and 5 and transferred to the next processing station.

The width of the roll R shown in FIGS. 1 and 2 is smaller than the diameter and therefore it is advantageously transferred resting on one of its flat surfaces. Therefore, upstream of the device 1, per se known means will be provided which will tip the rolls through 90° with respect to the longitudinal direction of travel.

Figure 4:
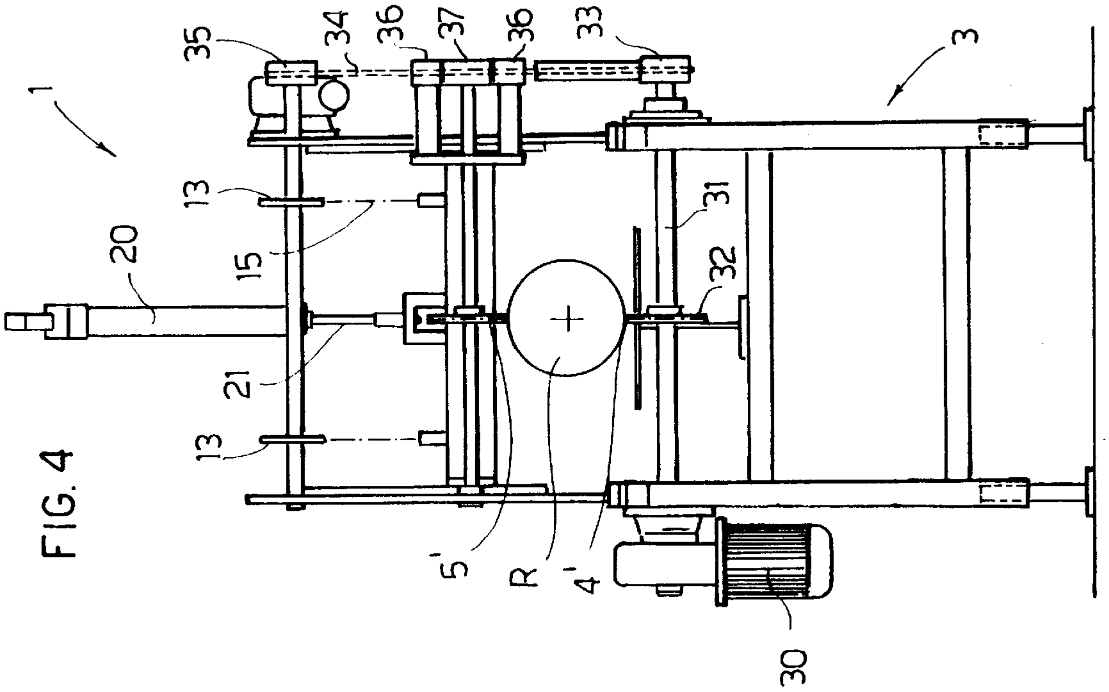
FIGS. 3 and 4 are similar views to FIGS. 1 and 2, respectively, showing conveying of a roll of the correct size, travelling in the direction of its axis.
Figure 3:
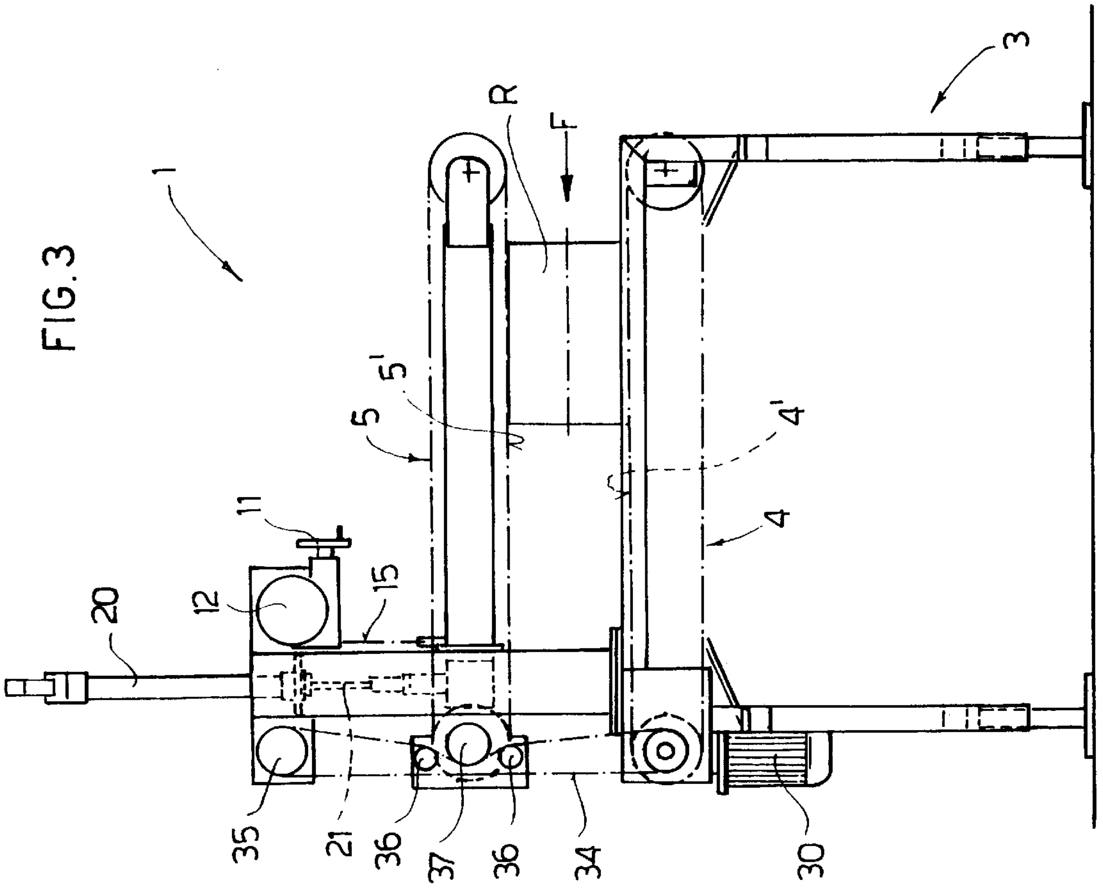

FIGS. 3 and 4 show the transfer of rolls having a width that is greater than the diameter, which travel in the direction of their axis. The roll, again indicated by the letter R, is gripped by the two belts 4 and 5 at the points coinciding with two opposite generators. FIGS. 3 and 4 show the top belt 5 in a higher position than in FIGS. 1 and 2. As can be seen, there is no need for any intervention on the transmission consisting of the belt 34 and the wheelwork 36, 37.

Figure 5:
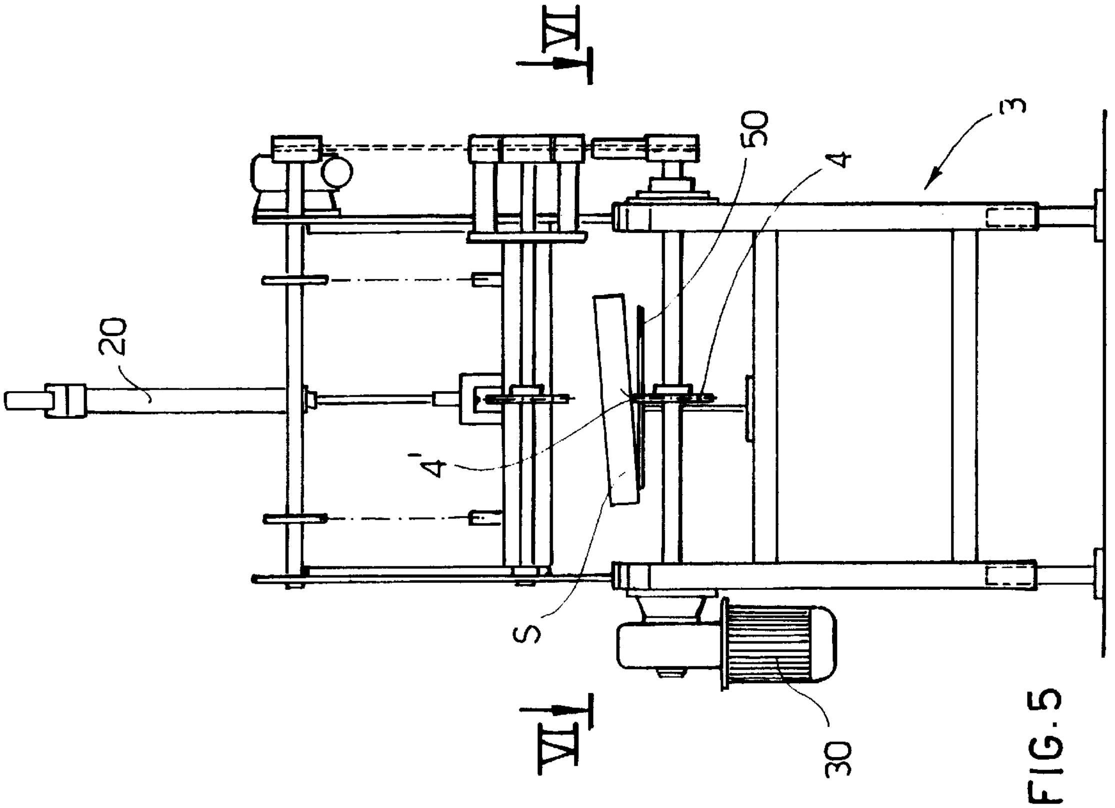
FIG. 5 is a front view similar to those of FIGS. 2 and 4, showing a scrap as it falls.

FIGS. 5 and 6, on the other hand, illustrate the case in which the device 1 according to the invention is fed with a scrap S.

Since the distance between the belts 4 and 5 is adjusted according to the correct size of the roll and the width of the head or tail scrap S of the log is certainly smaller than the measurement of the roll, whether this be the width or the diameter, said scrap S, once transferred to the device 1 according to the invention, will rest only on the bottom belt 4, and will not be gripped by the top belt 5, as shown in FIG. 5. Therefore, it will be inclined to one side, as shown in FIG. 5, and will tend to fall into the chamber of the device below, where suitable collection means could be provided.

To facilitate this fall, a system of fixed plates 50, on which the scrap S comes to rest in an inclined position, can be provided at the entrance of the device 1, at a lower level than the top branch 4' of the belt 4, as shown in FIG. 5. In this way the scrap S will rest on one side on the fixed plate 50 and will continue to be pulled at its center line by the belt 4. This will cause a rotary translational movement of the scrap S, which will accelerate movement thereof towards the side resting on the plate 50, facilitating falling thereof into the chamber below the belt 4, as shown diagrammatically in FIG. 6, in which the successive positions of the scrap S are shown, up to falling.

Obviously the invention is not limited to the particular embodiment described previously and illustrated in the appended drawings, but numerous modifications can be made to the details thereof within the scope of an expert in the field.

Thus, for example, although specific reference has been made in the foregoing description to a single pair of belts 4, 5 for transport of a single row of rolls R, it is obvious that a plurality of pairs of belts can be provided, arranged on parallel vertical planes, for simultaneous transport of a plurality of rows of rolls.

What is claimed is:

1. A device for automatic elimination of the head and tail scraps (S) that are left after rolls of paper (R), comprising toilet paper, kitchen paper, and paper for industrial use, have been cut from a log and made to travel longitudinally in the direction of their axis, or flat, perpendicularly to their axis, said device comprising:

at least one pair of belts (4, 5) arranged one above the other on a vertical plane, a mechanism for providing an adjustable distance between said pair of belts, so that the respective opposite inside branches of said belts (4', 5') advancing in the same direction of travel as the roll (R), are disposed in contact with the two opposite sides of a roll (R) of a correct size, said bottom belt being sized so that a scrap (S) that comes into contact only with the bottom belt (4) will fall to the side of the belt into a chamber below, through loss of balance from its resting point on said bottom belt.

2. A device according to claim 1, characterized in that at the entrance to the device, on a lower level than the upper branch (4') of the bottom belt (4), a system of fixed plates (50) is provided, such as to impart, together with the belt (4), a rotary translational movement to the scraps (S), accelerating falling thereof from the belt (4).

3. A device according to claim 2, characterized in that said top belt (5) is mounted on a vertically mobile carriage.

4. A device according to claim 3, characterized in that said carriage (10) can be moved vertically by means of a handwheel (11) acting on a reduction unit (12) which, by means of gears (13) and chains (15), causes raising and lowering of the carriage (10).

5. A device according to claim 4, characterized in that a pneumatic cylinder (20) is provided, the stem (21) of which is constrained to said carriage (10), acting as a damper for any small shifts from the nominal position of the carriage (10) set by means of said handwheel (11).

6. A device according to claim 1, characterized in that a single geared motor (30) is provided for direct driving of said bottom belt (4) and, by means of transmissions, of said top belt (5).

7. A device according to claim 6, further comprising:

a first pulley (32) for direct driving of the bottom belt (4), said first pulley (32) being splined on the center of a shaft (31) coming out of said geared motor (30) and passing transversally through the device, a second pulley (33) mounted at a free end of said shaft (31), said second pulley (33) being rotated by means of a belt (34), running on an upper idler pulley (35), to drive a shaft (10) on the center line of which a third pulley (39)

driving said upper belt (5) is splined, the first and third pulleys (32) and (39) being driven in opposite directions.

8. A device according to claim 1, characterized in that said device provides for a plurality of pairs of belts (4, 5) arranged on parallel vertical planes, for simultaneously transporting a plurality of rows of rolls.

9. A device according to claim 8, characterized in that said plurality of pairs of belts (4, 5) are driven by the same mechanism.

10. A device according to claim 1, characterized in that said top belt (5) is mounted on a vertically mobile carriage (10).

11. A device according to claim 10, characterized in that said carriage (10) can be moved vertically by means of a handwheel (11) acting on a reduction unit (12) which, by means of gears (13) and chains (15), causes raising and lowering of the carriage (10).

12. A device according to claim 10, characterized in that a pneumatic cylinder (20) is provided, the stem (21) of which is constrained to said carriage (10), acting as a damper for any small shifts from the nominal position of the carriage (10) set by means of said handwheel (11).

* * * * *